Oct. 24, 1961 K. B. SORENSEN ET AL 3,005,426
PLANTERS
Filed May 2, 1958 2 Sheets-Sheet 2

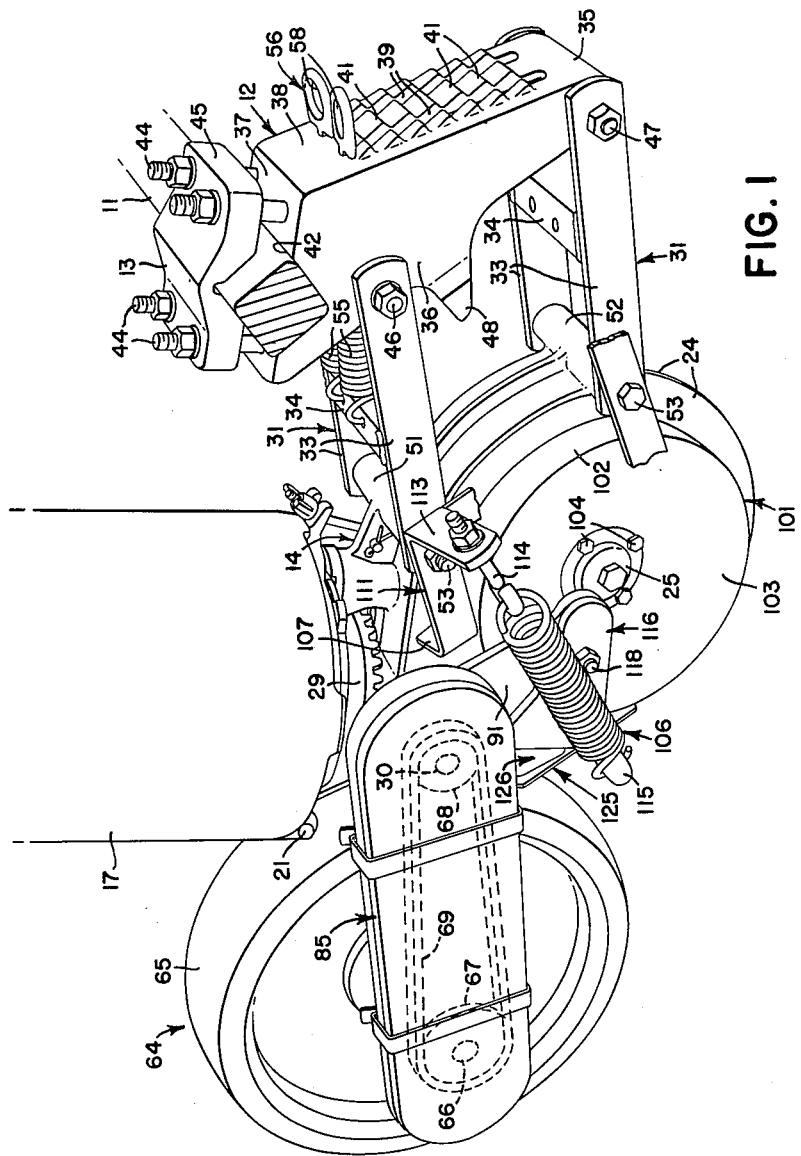

INVENTORS.
KNUD B. SORENSEN
ARTHUR J. BJERKAN
LEON F. SANDERSON
BY
Roger C. Johnson
ATTORNEYS

United States Patent Office 3,005,426
Patented Oct. 24, 1961

3,005,426
PLANTERS
Knud B. Sorensen, Waterloo, Iowa, Arthur J. Bjerkan, Moline, Ill., and Leon F. Sanderson, Des Moines, Iowa, assignors, by mesne assignments, to Deere & Company, a corporation of Delaware
Filed May 2, 1958, Ser. No. 732,670
2 Claims. (Cl. 111—63)

The present invention relates generally to agricultural implements and more particularly to planting means of the unit type, of which a plurality of such units are usually attached to a transversely disposed toolbar or other support mounted on a tractor or the like.

The object and general nature of the present invention is a provision of a depth band attachment for a unit planter of the type that includes a disk furrow opener, a spring biased furrow opener boot, and a press wheel that is connected to drive the material dispensing means that is carried on the furrow opener boot. The depth band attachment of this invention includes means accommodating a limited amount of swinging of the press wheel, so as to permit the depth band to perform its function of determining depth of operation, and biasing means acting to hold the press wheel in firm contact with the ground, especially when operating under non-uniform field conditions or in poorly prepared seed beds.

The depth band attachment of this invention is particularly adapted for use with planting units in which the press wheel is normally used to determine the depth of planting, as by being connected with the furrow opener boot so as to limit the downward movement of the latter. According to this invention, means is provided to permit the press wheel to have some floating action yet is given sufficient down pressure to drive the associated dispensing mechanism.

A further feature of this invention lies in the provision of press wheel spring biasing means that is connected to the press wheel chain housing by the same means that normally connects the depth adjusting means thereto when the press wheel serves also as the depth gauge means.

These and other objects and advantages of the present invention will be apparent to those skilled in the art after a consideration of the following detailed description, taken in conjunction with the accompanying drawings, in which:

FIG. 1 is a perspective view of a toolbar mounted unit planter incorporating the principles of the present invention.

Figure 3:
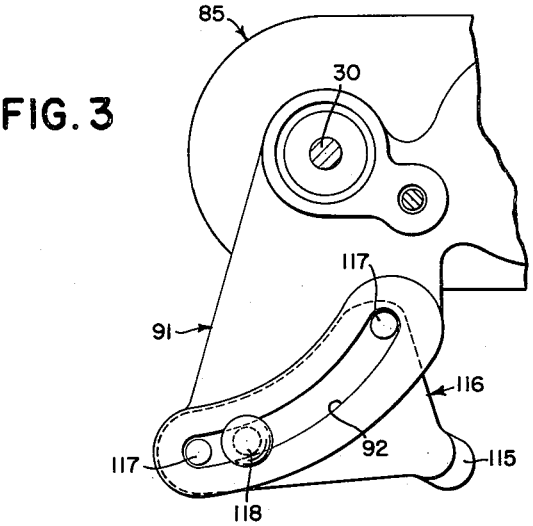
FIG. 3 is an enlarged fragmentary view showing the connection of the press wheel biasing spring bracket with the chain housing that carries the press wheel.

Referring first to FIG. 1, the planting unit is shown as detachably mounted on a toolbar 11 that is square in cross section and conventionally is carried at the rear of the tractor for receiving a plurality of planting units. Preferably, the toolbar 11 is arranged on the tractor with the bar in a diagonal disposition, one edge of the bar being disposed in an uppermost position and the opposite edge in a lowermost position. The planting unit includes a mounting bracket 12 secured to the toolbar or support 11 by clamp means 13, and the planting means includes a furrow opener boot 14, preferably in the form of a casting having a rear extension adapted to hingedly receive a hopper 17 in which conventional seed selecting means is disposed. Preferably, the hopper 17 includes a hopper bottom having lugs that are apertured to receive a hinge pin 21 that, when the hopper 17 is mounted in position on the furrow opener boot, is disposed in a notched opening formed in the rear portion of the furrow opener boot extension. The latter also includes a lower bearing section on which a pair of disk furrow openers 24 are mounted for rotation, as by conventional bearing means 25. A seed passageway at the upper portion of the furrow opener boot 14 receives seed from the dispensing means of the hopper 17 and conducts the seed downwardly into the furrow opened by the disks 24.

The dispensing mechanism within the hopper 17 is per se conventional and has not been shown. It is actuated by the usual gear 29 carried for rotation at the upper part of the boot casting 14. The gear 29 is driven by a pinion (not shown) that is fixed to a cross shaft one end portion of which is indicated at 30 (FIGS. 1 and 3). The shaft 30 is carried in any suitable way by the boot 14.

The furrow opener boot 14 and associated parts, including the hopper 17, are mounted for relatively free floating movement with respect to the support or toolbar 11 and to this end a pair of parallel link units 31 are provided for swingably connecting the furrow opener boot 14 with the mounting bracket 12. Each of the link units 31 comprises a pair of spaced apart bars 33 held in spaced apart relation by a strut 34 securely fixed, as by welding, at its ends to the associated links 33. The mounting bracket 12 comprises, in general, a channel-like part 35 having sides 36, an upper wall portion 37 and a forward wall portion 38, the latter being provided with a pair of slots 39 and transverse ribs 41 for a purpose that will be referred to later. The upper face 37 is provided with V-shaped notches 42 that, as best shown in FIG. 1, are adapted to engage the lower surfaces of the toolbar 11, and the upper face 37 of the mounting bracket is also provided with a plurality of bolt-receiving openings in which a plurality of fasteners 44, extending upwardly through a clamping cap 45, are received. When the fasteners 44 are tightened, the mounting bracket 12 is securely fixed to the toolbar or support 11. The side portions 36 of the mounting bracket 12 are apertured to receive pivot means 46 and 47 by which the forward portions of the link units 31 are connected with the bracket 12 for generally vertical swinging movement. The side portions 36 are provided with outwardly and rearwardly disposed extensions or lugs 48 that are located so as to engage the forward portions of the links 33 of the upper link unit 31, serving thereby as stops for limiting the downward swinging of the upper link unit 31 and hence limiting the downward movement of the furrow opener boot 14 and associated parts. To provide means to receive the rear portions of the parallel link units 31, the furrow opener boot 14 is provided with upper and lower transverse tubular extensions 51 and 52 by which pivot bolt means 53, extending through the rear apertured ends of the upper and lower links 33 and through associated bushings (not shown), swingably mounts the furrow opener boot 14 and associated parts on the rear or lower ends of the parallel link units 31.

Spring means is provided for applying an adjustable amount of down pressure so as to force the furrow opening disks 24 into the ground, and provision is made whereby the amount of down pressure exerted may be adjusted by the operator without the use of any tools, levers or the like, although in some cases a relatively large amount of down pressure may be required. For this purpose, a pair of springs 55 are connected between the upper link unit 31 and the mounting bracket 12.

Each of the springs is indicated by the reference numeral 55, and the rear ends of the springs 55, as can best be seen in FIG. 1, are hooked into openings formed in the upper strut 34. The forward end of each spring 55 receives the rear portion of a spring eye member 56, and each of these members includes a narrow portion that extends through the associated slot 39, being formed at its forward end with a finger hole portion 58 and associated shouldered portions that lie between selected ribs 41, the mounting bracket 12 being so shaped that a greater spring pressure is exerted when the eye members 56 engage in the lower ribbed portions of the bracket. The springs 55 may be individually adjusted, and two springs are provided, rather than a single spring, so that an operator may more readily adjust the springs to different positions, as desired, even to the positions where relatively substantial forces are exerted, because the springs may be adjusted one at a time, and therefore less force need be exerted by the operator than would be the case if he were required to adjust a single relatively strong spring. Also, by having two springs, a relatively finer adjustment may be secured since one spring may be adjusted along the forward face of the mounting bracket to a position slightly different from that to which the other spring is brought.

A press wheel unit 64 is movably connected with the furrow opener boot casting 14 and is employed, not only to firm the soil about the planted seed, but also to drive the seed dispensing means that forms a part of the planting unit. The press wheel itself is indicated at 65 and is per se generally of conventional construction, being fixedly connected with a shaft 66 that is journaled for rotation in the outer end of wheel-supporting arm means in the form of a chain housing 85 that at its forward end is connected with the furrow opener boot 14 through the shaft 30 and is rockable generally vertically about the axis of the cross shaft 30. A sprocket 67 is fixed to the part 66 and a similar sprocket 68 is fixed to the shaft 30. A drive chain 69 is disposed within the housing 85 and drivingly connects the sprockets 67 and 68 whereby rotation of the press wheel 65 drives the dispensing means disposed within the hopper 17.

In most cases where the seed bed is carefully prepared, the depth of operation of the disk furrow openers may be controlled by fixing the chain housing 85 to the boot casting 14 in a selected position of adjustment. This is done by providing an arcuate extension 91 on the housing 85. The extension 91 is arcuately slotted, as at 92 (FIG. 2), and fixed, as by bolt means 93, to a link member 94 that receives the upper pivot bolt 53. Occasions may arise, however, as where seed beds are poorly prepared or where for these or other reasons seed beds are abruptly variable in density, in which drive wheel depth gauging may not be entirely satisfactory.

To take care of the conditions just mentioned, the present invention contemplates the provision of means providing for the addition of depth bands fixed directly to the disk furrow openers 24 and means mounting the chain housing 85 so that it is free, within limits, to swing generally vertically, but with spring biasing means acting between the boot casting 14 and the chain housing so as to continually urge the press wheel 65 downwardly with sufficient down pressure to assure adequate traction so that, although the press wheel may float to permit the control of the depth of planting by the depth bands, the press wheel 65 is positively and accurately driven by ground contact so as to actuate the dispensing mechanism.

According to this invention, we provide a pair of depth bands 101, preferably in the form of wheels having fairly wide peripheral portions 102 and web-like center sections 103 that are apertured to receive cap screws 104 or other suitable means by which the depth band units 101 may be fixed to the associated furrow opening disks. The depth of planting is thus controlled accurately by means carried directly on the disk openers. Where required, changes in the depth of operation may be made by substituting smaller or larger depth band wheels, as desired.

Figure 2:
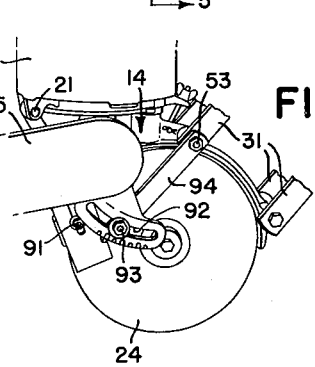
FIG. 2 is a fragmentary view showing the connection between the chain housing and the boot casting when the press wheel is utilized also as a depth gauge wheel, as when operating under uniform field conditions.

In order to provide for floating action of the press wheels 65, we propose, in effect, to substitute a biasing spring means, indicated by the reference numeral 106, for the link member 94 shown in FIG. 2. After removing the latter member, we attach a Z-shaped bracket 111 to the boot casting 14 by means of the upper pivot bolt 53. Rear fastening means includes a laterally inturned slotted portion 107 that engages an adjacent flange or lug on the upper portion of the boot casting. The bracket 111 also includes an out-turned portion 113 that is apertured to receive an eye bolt 114 to which the tension spring 106 is connected at one end. The other end of the spring 106 is connected to a lug 115 that is carried on an attachment plate 116 fixed to the chain housing extension 91.

The plate 116, as best shown in FIG. 3, is generally triangular in shape and is provided at its inner face with a pair of lugs 117 that are adapted to engage in the end sections of the slot 92 of the chain housing arm or extension 91. The plate 116 is apertured to receive a bolt 118 that fixes the plate 116 to the arm 91. When the bolt 118 is tightened the plate 116 becomes a part of the arm or extension 91.

Figure 4:
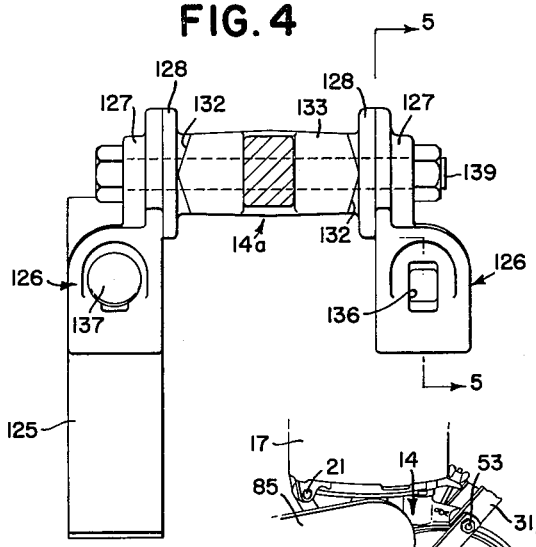
FIG. 4 is a fragmentary view showing a portion of the furrow opener boot casting and the associated depth band scraper support.
Figure 5:
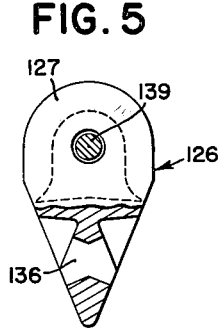
FIG. 5 is a sectional view taken generally along the line 5—5 of FIG. 4.

The eye bolt 114 is adjusted to give the necessary tension so as to hold the press wheel 65 with sufficient down pressure to drive the dispensing means, yet the spring 106 may yield to permit the press wheel to pass over uneven ground without raising the disks 24. The main springs 55 act, as described above, to hold the furrow opening disks 24 in the ground to the extent permitted by the depth band members 102.

Where depth bands are used, scrapers may be required and to supply these we provide a pair of scraper blades 125, one for each depth band 101. Each scraper blade 125 is fixed at its upper end to the lower or wider part of a scraper bracket 126. The upper part 127 of each scraper bracket is shaped to fit flat against an adapter bushing 128, one side of which is flat (FIG. 4), and the other side of which is angled so as to fit against the associated beveled end 132 of a transverse sleeve section 133 that forms a part of the rear portion 14a of the furrow opener boot casting 14. The blade-receiving portion of each of the brackets 126 is apertured, as at 136, so as to receive the head of a carriage bolt 137. As will be seen in FIG. 5, the lower part of each bracket 126 is wedge shaped and each bracket is symmetrical about a vertical plane, whereby the bracket may be used either at the right side or the left side of the planter. A bolt 139 extends through the sleeve 133 and the upper portions 127 of the brackets 126 to fix the latter in position on the boot casting 14.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim and desire to secure by Letters Patent is:

1. An agricultural implement comprising a mobile support, a mounting bracket attached to said support, a furrow opener boot carrying a pair of disk furrow openers, material dispensing means carried by the furrow opener boot, parallel link means pivotally connected at their upper and forward ends with said bracket, a pair of generally vertically spaced transversely disposed pivot means connecting the lower rear ends of said parallel link means with said boot, whereby the latter is connected with said mounting bracket for generally free floating movement relative thereto, adjustable spring means connecting said boot with said bracket for applying a generally downwardly directed force to said furrow openers, a depth band fixed to each disk furrow opener so as to limit the depth of penetration of said furrow openers, a press wheel unit disposed in rear of said furrow openers and including a press wheel and wheel supporting arm means swingably connected with said furrow opener boot, means to drive said dispensing means from said press wheel, an extension on said press wheel unit, a biasing spring connected at one end with said extension, and means anchoring the other end of said spring with one of said transverse pivot means.

2. A planting unit comprising a support, a disk furrow opener boot carrying a furrow opener and connected with said support for generally vertical movement relative thereto, dispensing means carried by said boot and including a driven shaft and a driven sprocket thereon, spring means acting between said boot and said support for urging the boot downwardly, depth band means carried by the disk furrow opener to limit penetration thereof, a chain housing pivotally connected with said boot and swingable relative thereto, one end portion of said chain housing enclosing said driven sprocket and swingable relative to said boot about the axis of said driven shaft and sprocket, a press wheel shaft journaled in the other end of said chain housing, a press wheel fixed to said press wheel shaft, drive means connecting the press wheel with said dispensing means and including drive chain means carried in said housing and trained over said sprockets for driving said dispensing means from said press wheel, an arm extending downwardly from said one end portion of said chain housing, and spring means connected between said boot and chain housing arm for urging said press wheel downwardly.

References Cited in the file of this patent

UNITED STATES PATENTS

| | | |
|---|---|---|
| 1,415,674 | Mitchell | May 9, 1922 |
| 1,972,703 | Collins | Sept. 4, 1934 |
| 2,190,359 | Hipple | Feb. 13, 1940 |
| 2,318,205 | Drennan | May 4, 1943 |
| 2,496,885 | Milton | Feb. 7, 1950 |
| 2,704,524 | McIntyre | Mar. 22, 1955 |
| 2,724,318 | Erickson et al. | Nov. 22, 1955 |
| 2,738,969 | Morris et al. | Mar. 20, 1956 |
| 2,745,330 | Nelson | May 15, 1956 |
| 2,789,736 | Agnolleto | Apr. 23, 1957 |

OTHER REFERENCES

E. DeVisart Publication Serial No. 254,631, May 11, 1943.

John Deere Publication OM–D3–851, received in Scientific Library September 28, 1956, only pages 2, 17, 18, 29 and 35 required.